United States Patent Office 3,641,066
Patented Feb. 8, 1972

3,641,066
CATALYTIC PROCESS FOR EPOXIDATION OF OLEFINIC COMPOUNDS IN THE PRESENCE OF MOLECULAR OXYGEN
Jean Rouchaud, Brussels, Belgium, and Irénée Seree de Roch, Rueil-Malmaison, France, assignors to Institut Francais du Petrole, des Carburants et Lubrifiants, Rueil-Malmaison, France
No Drawing. Filed Sept. 11, 1969, Ser. No. 857,202
Claims priority, application France, Sept. 16, 1968, 166,397
Int. Cl. C07d *1/08, 1/12*
U.S. Cl. 260—348.5 V       3 Claims

ABSTRACT OF THE DISCLOSURE

In the liquid phase catalytic epoxidation of olefins, such as propylene, a novel catalyst is provided, composed of molybdenum, tungsten, or vanadium, or a compound thereof, deposited on a zeolite, such as a molecular sieve of the X type, the pores of the zeolite having a diameter of 6–10 angstroms, the molybdenum, tungsten or vanadium content of said catalyst being between 0.02 and 20% by weight with respect of the weight of the carrier, the catalyst being used in an amount of from $10^{-1}$ to $10^{-5}$ gram-atoms of metal per kilogram of feedstock.

---

This invention relates to epoxidation of olefinic compounds and more particularly to the manufacture of 1,2 epoxide by direct oxidation of olefins by means of molecular oxygen, in the presence of catalysts.

According to the type of olefin, taking into account its vapor pressure under the operating conditions, the reaction will be carried out with or without a solvent (inert with respect to oxygen or taking part in the oxidation reaction).

Schematically, the reaction conforms to the following diagram:

$$\diagup C=C \diagdown + 1/2 O_2 \xrightarrow{\text{catalyst}} \diagup C \underset{O}{\diagdown \diagup} C \diagdown$$

The oxidations are conducted within a temperature range of from 20 to 250° C., preferably between 60 and 180° C. The oxygen partial pressure may be chosen between 0.05 and 60 kg./cm.$^2$, preferably between 0.05 and 20 kg./cm.$^2$. The feeding gas may consist of pure oxygen, air, air enriched or diluted with nitrogen. The presence of CO and of $CO_2$ has no other inconvenience than that of increasing the total pressure in the oxidation reactor.

The oxidation reactions being conducted in the liquid phase, some olefins will require the use of a solvent in order to be oxidized according to the invention without involving the use of a too high total pressure in the reactor.

The solvent will have to be inert with respect to oxygen inasmuch as it has to be recycled and to exhibit a good dissolving power with respect to the olefins. The solvents will be selected mainly from substituted or unsubstituted aromatic hydrocarbons, alcohols, ethers or polyethers and esters which are tolerated although their use does not result in any substantial advantage.

As examples are to be mentioned: benzene, chlorobenzene, o-dichlorobenzene, diphenyl, nitrobenzene, phenyl oxide, phenyl polyoxide, such as or homologs thereof.

Amongst the esters there will be selected those which exhibit a good thermal stability together with a high resistance to oxidation. There will be used either monoester or polyesters, preferably the esters of acetic, benzoic phthalic, isophthalic, terephthalic acids or of acids complying with the formula:

$$R_1 - \underset{\underset{R_2}{|}}{\overset{\overset{CH_3}{|}}{C}} - \overset{O}{\overset{\|}{C}} - OH$$

wherein $R_1$ and $R_2$ are each an alkyl group having from 1 to 15 carbon atoms.

As alcohols, besides methyl, ethyl and tertiary butyl alcohols, there may be used glycols, such as propylene glycol and neopentyl glycol. Pentaerythrite also provides esters which constitute excellent solvents.

Certain saturated hydrocarbons such as isooctane may be used as solvents as well as certain ketones and certain alcohols, such as acetophenone and tertiary butanol. The above-mentioned solvents may be used separately or in admixture so as to obtain the best efficiency.

The solvent content of the mixture subjected to oxidation will be advantageously between 5 and 70%, but, in order to reduce the dilution effect which results in a decrease of the oxidation rates, there are used preferably solvent contents between 5 and 65%.

The catalyst according to this invention consists of molybdenum, tungsten or vanadium or of compounds of these metals deposited on a solid carrier of the zeolite type.

The impregnation of the solid carrier is carried out according to conventional methods from a solution of a salt or an acid of the metal under consideration.

The selected carriers are artificial zeolites with an opening diameter of the pores between 6 and 10 A. They are mainly of the X or Y commercial type.

The metal content of the catalyst will be between 0.02 tand 20% and preferably between 0.5 and 12% by weight with respect to the weight of the carrier. After impregnation the catalyst is dried at an average temperature of 120° C. for about 24 hours. A higher temperature is not detrimental to the activity of the catalyst; although temperatures in excess of 600° C. are preferably avoided so as not to change significantly the structure of the zeolite. The water content of the catalyst, depending on the temperature and the drying period, is about 5 to 50% by weight.

The water content has no substantial influence on the catalytic activity.

There is prepared a catalyst with a molybdenum base, for instance by impregnating the sodium 13 X zeolite (Linde) having a grain size of from 60 to 120 mesh, with an aqueous solution of ammonium paramolybdate. After drying for about 24 hours at a temperature of about 120° C., the molybdenum is determined by the complex formed between molybdenum and thiocyanate after attack of the catalyst by means of perchloric acid. The so-formed catalyst contains 8±0.5 g. percent by weight of molybdenum.

The catalyst will be used in such an amount that the metal content of the solution be of about $10^{-1}$ to $10^{-5}$ gram-atoms per kilogram of feedstock.

The present invention is applicable to aliphatic or cyclic, branched or unbranched olefins containing from 1 to 16 carbon atoms, and preferably conforming with the general formula:

$$R_1 - \underset{\underset{R_5}{|}}{C}H - \underset{\underset{R_4}{|}}{C} = \underset{\underset{R_3}{|}}{C} - R_2$$

wherein $R_1$ and $R_5$ are identical to or different from each other and represent either a hydrogen atom or alkyl, aryl, alkyl-aryl, aralkyl radicals and the like, two radicals being optionally joined together to form a cycle.

As specific examples, are to be mentioned: propylene, isobutene, 1-butene, 2-butene, 2-methyl 2 butene, 3-methyl 1-butene, n-pentenes, 2,4,4-trimethyl 1 pentene, 2,4,4-trimethyl 2 pentene, 2 ethyl 1 hexene, cyclopentene, cyclohexene, 4-ethyl 1 cyclohexene.

According to the present process, the olefins which are subjected to the action of oxygen may contain corresponding or higher saturated homologs. Thus, the propylene may contain propane or butane and isobutane. Small amounts of these hydrocarbons will be converted during the reaction, the yield in epoxide being thus increased due to the presence of these paraffins.

There can also be selected as solvents alkyl aromatic hydrocarbons having from 6 to 40 carbon atoms, such as toluene, xylenes, taken separately or in admixture, and ethylbenzene. These hydrocarbons may be used as such or in solution in any carboxylic acid with the exception of formic acid. Acetic acid will be used preferably in view of its low oxidizability and its moderate action on epoxides (I. Seree de Roch, Bull. Soc. Chim., 1965, p. 1981). However, in this case, the non-olefinic hydrocarbons will not act exclusively as solvents since they are also converted during the reaction, the toluene being converted to benzaldehyde, benzyl alcohol and benzoic acid principally, the xylenes in mono and diacids and ethylbenzene to acetophenone and methyl-phenyl carbinol. This procedure is of particular interest since it provides for the simultaneous production of highly valuable oxygenated products.

The following nonlimitative examples are given for illustrative purposes. The experiments have been carried out in a stainless steel reactor provided with a turbine stirrer.

EXAMPLE 1

510 g. of propylene in 800 g. benzene are epoxidated at 150° C., under an oxygen pressure of 15 kg./cm.$^2$. The catalyst is molybdenum deposited on a molecular sleeve 13X, the molybdenum content being 8% by weight. The conversion obtained is 7.5%. The selectivity in epoxide is optimum for a given concentration of catalyst in the reaction medium, as it is apparent from the following table.

| | Mo $10^{-4}$ gram-atoms per kg. of feedstock | | | | | | |
|---|---|---|---|---|---|---|---|
| | 0.5 | 2 | 8 | 15 | 25 | 35 | 42 | 60 |
| Percent: | | | | | | | | |
| Methyl formate | 2 | 2 | 2 | 2 | 3 | 3 | 2 | 2 |
| Methanol | 13 | 10 | 10 | 13 | 14 | 13 | 12 | 10 |
| Epoxypropane | 34 | 42 | 49 | 61 | 72 | 70 | 60 | 54 |
| Acetone | 6 | 5 | 3 | 8 | 6 | 7 | 7 | 6 |
| Propylene glycol formiate | 14 | 13 | 13 | 5 | 1 | 3 | 6 | 9 |
| Propylene glycol acetates | 10 | 9 | 9 | 3 | 1 | 2 | 4 | 6 |

EXAMPLE 2

350 g. of propylene in 700 g. of a mixture by equal volumes of benzene and glycol diacetate are epoxidated at 150° C. under an oxygen pressure of 15 kg./cm.$^2$. The catalyst consists of a molecular sieve 13X whose molybdenum content is 8.5% by weight; the catalyst amount involved in the reaction corresponds to $30.10^{-4}$ gram-atoms of metal per kilogram of feedstock. For a 10% conversion rate, the selectivity in epoxypropane amounts to 65%.

EXAMPLE 3

The preceding example is repeated with the use of tungsten as catalyst, the carrier being a zeolite of the X type. The tungsten content of the catalyst is 6.8%. The catalyst is used in a proportion of $30.10^{-4}$ gram-atoms of metal per kilogram of feedstock. For a conversion rate of 8%, the selectivity in epoxypropane is 67%.

EXAMPLE 4

With the use as solvent of a mixture of pentaerythritol tetraacetate and benzene by equal volumes, there is oxidized a mixture of butenes containing 15% of 1-butene and 85% of 2-butenes. The ratio: solvent/butenes is equal to 0.2.

The catalyst, supplied at a rate of $35.10^{-4}$ gram-atoms of metal per kilogram of feedstock, consists of molybdenum deposited on a molecular sieve of Y type, whose molybdenum content is 6.5%. The oxidation, conducted at 120° C. under an oxygen partial pressure of 10 kg./cm.$^2$, gives epoxides (1,2 epoxybutane, 2,3 epoxy cis and trans-butane) with a selectivity of 60% for a conversion rate of 8%.

What we claim is:

1. A process for epoxidation, in the liquid phase, of aliphatic or cyclic olefins, in the presence of molecular oxygen, at a temperature within the range of from 20° C. to 250° C., under an oxygen partial pressure between 0.05 and 60 kg./cm.$^2$, and in the presence of a catalyst, characterized in that said catalyst consists of molybdenum, tungsten or vanadium or a compound of these metals, deposited on a zeolite, the pores of which have an opening diameter between 6 and 10 A., the molybdenum, tungsten or vanadium content of said catalyst being between 0.02 and 20% by weight with respect to the weight of the carrier, the catalyst being used in an amount of from $10^{-1}$ to $10^{-5}$ gram-atoms of metal per kilogram of feedstock.

2. A process according to claim 1 wherein the zeolite is a molecular sieve of the X type.

3. A process according to claim 1, wherein the olefin is propylene.

References Cited

FOREIGN PATENTS 1,459,880  10/1966  France _____ 260—348.5 V

NORMA S. MILESTONE, Primary Examiner

U.S. Cl. X.R.

252—455 Z